(12) United States Patent
Malhotra et al.

(10) Patent No.: US 12,051,099 B2
(45) Date of Patent: Jul. 30, 2024

(54) SYSTEM, METHOD, AND NON-TRANSITORY MACHINE READABLE INFORMATION STORAGE MEDIUM FOR HANDLING POPULARITY BIAS IN ITEM RECOMMENDATIONS

(71) Applicant: Tata Consultancy Services Limited, Mumbai (IN)

(72) Inventors: Pankaj Malhotra, Noida (IN); Priyanka Gupta, Noida (IN); Diksha Garg, Noida (IN); Lovekesh Vig, Gurgaon (IN); Gautam Shroff, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 195 days.

(21) Appl. No.: 17/593,554

(22) PCT Filed: Aug. 25, 2020

(86) PCT No.: PCT/IN2020/050744
§ 371 (c)(1),
(2) Date: Sep. 20, 2021

(87) PCT Pub. No.: WO2021/038592
PCT Pub. Date: Mar. 4, 2021

(65) Prior Publication Data
US 2022/0188899 A1  Jun. 16, 2022

(30) Foreign Application Priority Data
Aug. 30, 2019  (IN) ............................ 201921035120

(51) Int. Cl.
*G06Q 30/00* (2023.01)
*G06F 16/22* (2019.01)
(Continued)

(52) U.S. Cl.
CPC ..... *G06Q 30/0631* (2013.01); *G06F 16/2237* (2019.01); *G06N 3/04* (2013.01)

(58) Field of Classification Search
CPC ........ G06Q 30/0631; G06N 3/08; G06N 3/04; G06F 17/16; G06F 17/2234
(Continued)

(56) References Cited

U.S. PATENT DOCUMENTS

2018/0173999 A1*  6/2018  Renard ................... G06F 40/30
2018/0341702 A1*  11/2018  Sawruk .................... G06N 5/01
(Continued)

FOREIGN PATENT DOCUMENTS

CN         105279288 A      8/2018
WO      WO2017017990 A1    2/2017
(Continued)

OTHER PUBLICATIONS

Zhang, Yi, Jianguo Lu, and Ofer Shai. "Improve network embeddings with regularization." Proceedings of the 27th ACM international conference on information and knowledge management. 2018. (Year: 2018).*

(Continued)

*Primary Examiner* — Michael Misiaszek
*Assistant Examiner* — Kennedy Gibson-Wynn
(74) *Attorney, Agent, or Firm* — FINNEGAN, HENDERSON, FARABOW, GARRETT & DUNNER LLP

(57) ABSTRACT

This disclosure relates generally to method and system for handling popularity bias in item recommendations. In an embodiment the method includes initializing an item embedding look-up matrix corresponding to items in a sequence of item-clicks with respect to a training data. L2 norm is applied to the item embedding look-up matrix to learn a normalized item embeddings. Using a neural network, a (Continued)

session embeddings corresponding to the sequences of item-clicks is modeled and L2 norm is applied to the session embeddings to obtain a normalized session embeddings. Relevance scores corresponding to each of the plurality of items are obtained based on similarity between the normalized item embeddings and the normalized session embeddings. A multi-dimensional probability vector corresponding to the relevance scores for the items to be clicked in the sequence is obtained. A list of the items ordered based on the multi-dimensional probability vector is provided as recommendation.

9 Claims, 8 Drawing Sheets

(51) Int. Cl.
  *G06N 3/04* (2023.01)
  *G06Q 30/0601* (2023.01)
(58) Field of Classification Search
  USPC .......................................................... 705/26.7
  See application file for complete search history.

(56) References Cited

U.S. PATENT DOCUMENTS

| | | | | |
|---|---|---|---|---|
| 2018/0365321 | A1* | 12/2018 | Ke | G06F 40/284 |
| 2019/0005383 | A1* | 1/2019 | Kantor | G06N 5/04 |
| 2019/0197404 | A1* | 6/2019 | Wang | G06N 3/08 |
| 2019/0251435 | A1* | 8/2019 | Shiebler | G06N 3/084 |
| 2020/0134034 | A1* | 4/2020 | Zhao | G06Q 30/0201 |
| 2021/0034984 | A1* | 2/2021 | Savvides | G06F 17/16 |

FOREIGN PATENT DOCUMENTS

| | | |
|---|---|---|
| WO | WO2018148493 A1 | 8/2018 |
| WO | WO2019017990 A1 | 1/2019 |

OTHER PUBLICATIONS

Yang, Longqi, et al. "Unbiased offline recommender evaluation for missing-not-at-random implicit feedback." Proceedings of the 12th ACM conference on recommender systems. 2018. (Year: 2018).*

Ren, Jing, et al. "Matching algorithms: Fundamentals, applications and challenges." IEEE Transactions on Emerging Topics in Computational Intelligence 5.3 (2021): 332-350. (Year: 2021).*

Moreira, Gabriel De Souza Pereira et al., "News Session-Based Recommendations using Deep Neural Networks", Machine Learning, Sep. 2018, Arxiv, https://arxiv.org/pdf/1808.00076.pdf.

Abdollahpouri, Himan et al., "Managing Popularity Bias in Recommender Systems with Personalized Re-ranking", Information Retrieval, Aug. 2019, Arxiv, https://arxiv.org/pdf/1901.07555.pdf.

Wang, Shoujin et al., "Attention-Based Transactional Context Embedding for Next-Item Recommendation", Computer Science, 2018, AAAI, https://aaai.org/ocs/index.php/AAAI/AAAI18/paper/viewFile/16318/15972.

Zhou, Fan et al., "Variational Session-based Recommendation Using Normalizing Flows", IEEE Access, May 2019, pp. 3476-3475, ACM, https://par.nsf.gov/servlets/purl/10122596.

Hidasi, Balázs et al., "Parallel Recurrent Neural Network Architectures for Feature-rich Session-based Recommendations", Proceedings of the 10th ACM Conference on Recommender Systems, Sep. 2016, pp. 241-248, ACM, https://alexiskz.files.wordpress.com/2016/06/feature/mn-paper1.pdf.

Hu, Guangneng, "Personalized Neural Embeddings for Collaborative Filtering with Text", Machine Learning, 2018, Arxiv, https://r2learning.github.io/assets/papers/CameraReadySubmission%202.pdf.

Gupta, Priyanka et al., "NISER: Normalized Item and Session Representations to Handle Popularity Bias", Machine Learning, Mar. 2021, Arxiv, https://arxiv.org/pdf/1909.04276.pdf.

Liu, Siwei et al., "A Heterogeneous Graph Neural Model for Cold-start Recommendation", Computer Science, Jul. 2020, pp. 2029-2032, ACM, http://eprints.gla.ac.uk/215377/1/215377.pdf.

International Search Report and Written Opinion mailed Feb. 11, 2021, in International Application No. PCT/IN2020/050744; 10 pages.

* cited by examiner

SYSTEM, METHOD, AND NON-TRANSITORY MACHINE READABLE INFORMATION STORAGE MEDIUM FOR HANDLING POPULARITY BIAS IN ITEM RECOMMENDATIONS

CROSS-REFERENCE TO RELATED APPLICATIONS AND PRIORITY

The present application is a U.S. National Stage Filing and claims priority from International Application No. PCT/IN2020/050744 filed on Aug. 25, 2020, which application claims priority from India Patent Application No. 201921035120 filed on Aug. 30, 2019. The complete disclosures of the referenced applications in their entireties are herein incorporated by reference.

TECHNICAL FIELD

The disclosure herein generally relates to item recommendations, and, more particularly, to system and method for handling popularity bias in item recommendations.

BACKGROUND

Item recommendations include predicting items that a user is likely to click next given the sequence of items clicked so far. In order to predict the likely click, typical SR models utilize information from past actions (e.g. item/product clicks) in a session.

The sequence of item interactions in a session can be modeled as graph-structured data to better account for complex item transitions. For example, neural networks can learn useful representations for such session-graphs. However, such NN-based recommendation models suffer from popularity bias. The term popularity bias herein refers to the fact that the models are biased towards recommending popular items, and fail to recommend relevant less popular or less frequent items. Therefore, these models perform poorly for the less popular new items arriving daily in a practical online setting.

SUMMARY

Embodiments of the present disclosure present technological improvements as solutions to one or more of the above-mentioned technical problems recognized by the inventors in conventional systems. For example, in one embodiment, a method for handling popularity bias in item recommendations is provided. The method includes initializing an item embedding look-up matrix corresponding to a plurality of items in a sequences of item-clicks with respect to a training data, via one or more hardware processors. Further, the method includes applying L2 norm to the item embedding look-up matrix to learn a normalized item embeddings corresponding to the item embedding look-up matrix, via the one or more hardware processors. Further, the method includes modelling, using a neural network (NN), a session embeddings corresponding to the sequences of item-clicks, via the one or more hardware processors. Also, the method includes applying, via the one or more hardware processors, L2 norm to the session embeddings to obtain a normalized session embeddings. Moreover, the method includes obtaining, via the one or more hardware processors, relevance score corresponding to each of the plurality of items based on similarity between the normalized item embeddings and the normalized session embeddings. Additionally, the method includes estimating, via the one or more hardware processors, a multi-dimensional probability vector corresponding to the relevance scores for the plurality of items to be clicked in the sequence. Finally, the method includes recommending, via the one or more hardware processors, a list of the plurality of items ordered based on the multi-dimensional probability vector In another aspect, a system for handling popularity bias in item recommendations is provided. The system includes one or more memories and one or more first hardware processors, the one or more first memories coupled to the one or more first hardware processors, wherein the one or more first hardware processors are configured to execute programmed instructions stored in the one or more first memories, to initialize an item embedding look-up matrix corresponding to a plurality of items in a sequences of item-clicks with respect to a training data. Further, the one or more first hardware processors are configured to execute programmed instructions to apply L2 norm to the item embedding look-up matrix to learn a normalized item embeddings corresponding to the item embedding look-up matrix. Further, the one or more first hardware processors are configured to execute programmed instructions to model, using a neural network (NN), a session embeddings corresponding to the sequences of item-clicks. Also, the one or more first hardware processors are configured to execute programmed instructions to apply L2 norm to the session embeddings to obtain a normalized session embeddings. Moreover, the one or more first hardware processors are configured to execute programmed instructions to obtain relevance score corresponding to each of the plurality of items based on similarity between the normalized item embeddings and the normalized session embeddings. Additionally, the one or more first hardware processors are configured to execute programmed instructions to estimate a multi-dimensional probability vector corresponding to the relevance scores for the plurality of items to be clicked in the sequence. Finally, the one or more first hardware processors are configured to execute programmed instructions to recommend a list of the plurality of items ordered based on the multi-dimensional probability vector.

In yet another aspect, a non-transitory computer readable medium for handling popularity bias in item recommendations. The method includes initializing an item embedding look-up matrix corresponding to a plurality of items in a sequences of item-clicks with respect to a training data. Further, the method includes applying L2 norm to the item embedding look-up matrix to learn a normalized item embeddings corresponding to the item embedding look-up matrix. Further, the method includes modelling, using a neural network (NN), a session embeddings corresponding to the sequences of item-clicks. Also, the method includes applying L2 norm to the session embeddings to obtain a normalized session embeddings. Moreover, the method includes obtaining relevance score corresponding to each of the plurality of items based on similarity between the normalized item embeddings and the normalized session embeddings. Additionally, the method includes estimating a multi-dimensional probability vector corresponding to the relevance scores for the plurality of items to be clicked in the sequence. Finally, the method includes recommending a list of the plurality of items ordered based on the multi-dimensional probability vector.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Typical deep learning approaches for item recommendation (SR) suffer from popularity bias, i.e. perform poorly for the long-tail (less popular or less frequent) items while being able to model the popular items well. As a result these approaches also perform poorly for the inherently less popular new items arriving on a daily basis during the warming-up phase in the practical online setting. A typical probability distribution of items depicting the long tail is illustrated in FIG. 1.

Recently, several effective models for SR based on deep neural networks architectures have been proposed that consider SR as a multiclass classification problem where the input is a sequence of items clicked so far in the session and the target classes correspond to the set of predicted items. Many of these approaches use sequential models like recurrent neural networks considering a session as a sequence of item click events. Certain other approaches, on the other hand consider a session as a set of items and use attention models while learning to weigh (attend to) items as per their relevance to predict the next item. Other known techniques use a combination of sequential and attention models.

An important building block in most of these deep learning approaches is their ability to learn representations or embeddings for items and sessions. A SR-GNN is capable of modeling the sessions as graph structured data using GNNs rather than as sequences or sets, noting that users tend to make complex to-and-fro transitions across items within a session: for example, consider a session $s=i_1, i_2, i_1, i_3, i_4$ of item clicks by a user. Here, the user clicks on item $i_1$, then clicks on item $i_2$ and then re-clicks on item $i_1$. This sequence of item-clicks induces a graph where nodes and edges correspond to items and transitions across items, respectively. For sequence of item-clicks in the above example, the fact that $i_2$ and $i_3$ are neighbors of $i_1$ in the induced session-graph, the representation/embeddings of $i_1$ can be updated using representations of its neighbors, i.e. $i_2$ and $i_3$, and thus obtain a more context-aware and informative representations/embeddings. It is worth noting that this way of capturing neighborhood information has also been found to be effective in neighborhood-based SR methods such as SKNN and STAN.

Figure 1:
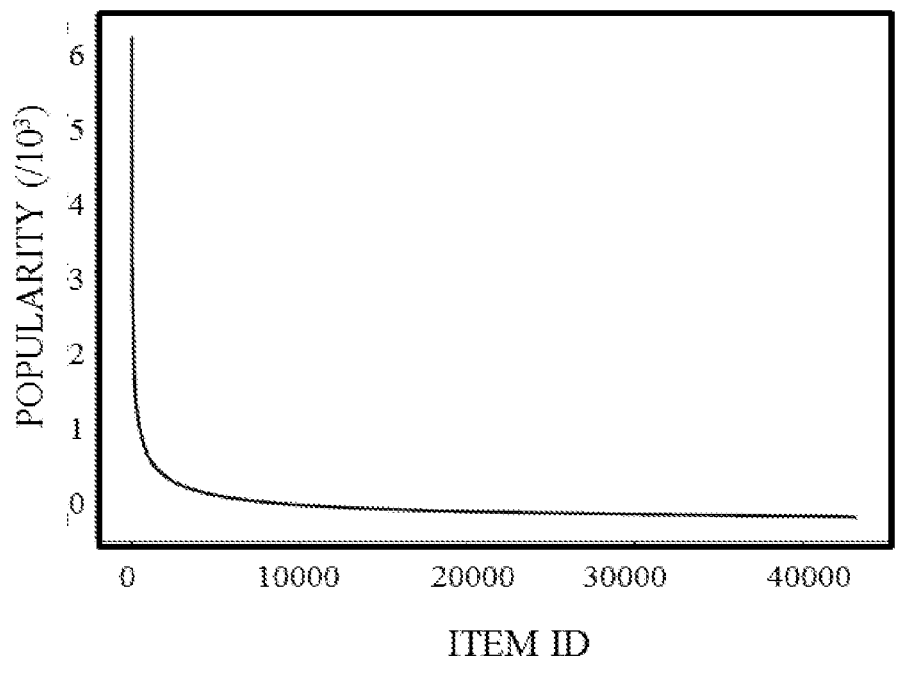
FIG. 1 illustrates a graphical representation of a typical probability distribution of items depicting the long tail according to some embodiments of the present disclosure.

As is known, popular items are likely to be presented and interacted-with resulting in a skewed distribution of items clicked by users on online platforms, as illustrated in FIG. 1. As a result, like other recommender systems, SR-GNN (referred to as GNN hereafter) also suffers from popularity bias, i.e. it tends to recommend more popular items. This problem is even more severe in a practical online setting where new items are frequently added to the catalog, and are inherently less popular during initial days.

Recent results in computer vision literature indicate the effectiveness of normalizing the final image features during training, and argue in favor of cosine similarity over inner product for learning and comparing feature vectors. A known technique introduces the ring loss for soft feature normalization which eventually learns to constrain the feature vectors on a unit hypersphere. Normalizing words embeddings is also popular in NLP applications, e.g. by penalizing the L2 norm of word embeddings for regularization. The conventional SR-GNN does not incorporate the sequential information explicitly to obtain the session-graph representation.

Various embodiments disclosed herein provide method and system for handing popularity bias in item recommendations by restricting the item and session-graph representations in GNNs to lie on a unit hypersphere both during training and inference. Moreover, the disclosed method and system incorporate a sequence of item-clicks) via position embeddings, thereby leveraging the benefits of both sequence-aware models (like RNNs) and graph-aware models. Herein, it will be understood that the sequence of item-clicks may include multiple history/past sessions of the same user. In an embodiment, the disclosed system addresses popularity bias in DNN-based SR using, for example, a SR-GNN as a working example. In addition, the disclosed system incorporates position embeddings, thereby leading to consistent improvement in recommendation performance. An example of the proposed system for handling popularity bias in item recommendations is described further with reference to FIGS. 2-8C.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 2 through 8C, where similar reference characters denote corresponding features consistently throughout the figures, there are shown preferred embodiments and these embodiments are described in the context of the following exemplary system and/or method.

Figure 2:
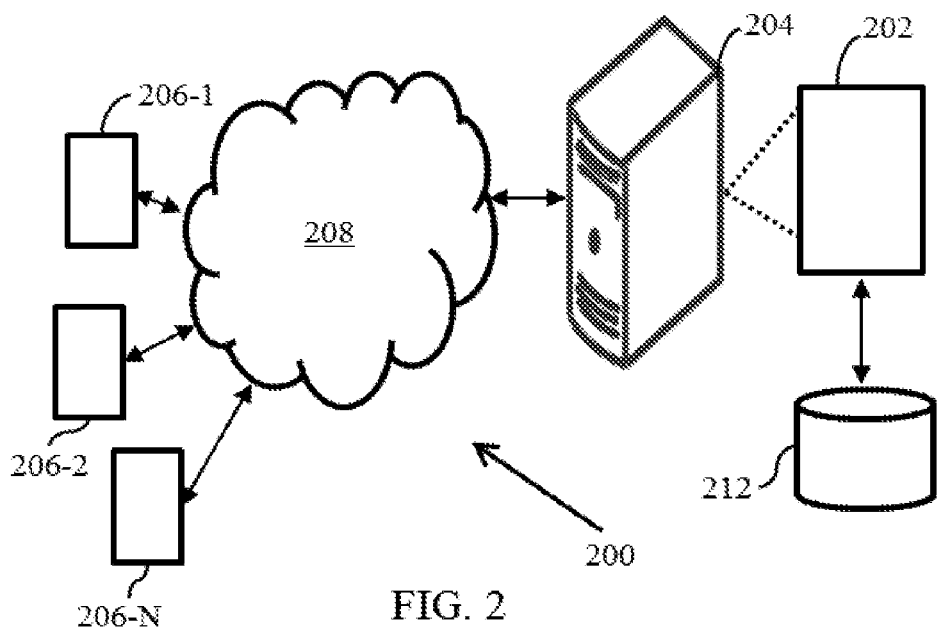
FIG. 2 illustrates an exemplary network environment for implementation of a system for handling popularity bias in recommending items according to some embodiments of the present disclosure.

FIG. 2 illustrates an example network implementation 200 of a system 202 for handling popularity bias in item recommendations, in accordance with an example embodiment. Herein it will be understood that the term 'item' refers to any entity displayed on the screen accessible to the user. In an embodiment, the entity may be a product being sold online, a video being displayed online, and so on. Examples of the entity may include, but are not limited to, accessories, garments, electronic items, grocery items, related to hospitality, financial products, advertisements, and so on. The disclosed system for recommendations is configured to predict those item(s) that are most likely to be clicked by the user.

As discussed previously, typical item-frequency distribution with long tail leads to popularity bias in state-of-the-art deep learning models such as GNNs for item recommendation. This is partially related to the 'radial' property of the softmax loss that, herein, implies that the norm for popular items will likely be larger than the norm of less popular items. Learning the representations for items and session-graphs by optimizing for cosine similarity instead of inner product can facilitate in handling the issue of popularity bias to a large extent. Said ability of the disclosed system 202 to reduce popularity bias is particularly useful in the online setting where the newly introduced items tend to be less popular and are poorly modeled by existing approaches.

Although the present disclosure is explained considering that the system 202 is implemented on a server, it may be understood that the system 202 may also be implemented in a variety of computing systems 204, such as a laptop computer, a desktop computer, a notebook, a workstation, a cloud-based computing environment and the like. It will be understood that the system 202 may be accessed through one or more devices 206-1, 206-2 . . . 206-N, collectively referred to as devices 206 hereinafter, or applications residing on the devices 206. Examples of the devices 206 may include, but are not limited to, a portable computer, a personal digital assistant, a handheld device, a Smartphone, a tablet computer, a workstation and the like. The devices 206 are communicatively coupled to the system 202 through a network 208.

In an embodiment, the network 208 may be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the system 202 through communication links.

As discussed above, the system 202 may be implemented in a computing device 204, such as a hand-held device, a laptop or other portable computer, a tablet computer, a mobile phone, a PDA, a smartphone, and a desktop computer. The system 202 may also be implemented in a workstation, a mainframe computer, a server, and a network server. In an embodiment, the system 202 may be coupled to a data repository, for example, a repository 212. The repository 212 may store data processed, received, and generated by the system 202. In an alternate embodiment, the system 202 may include the data repository 212.

The network environment 200 supports various connectivity options such as BLUETOOTH®, USB, ZigBee and other cellular services. The network environment enables connection of devices 206 such as Smartphone with the server 204, and accordingly with the database 212 using any communication link including Internet, WAN, MAN, and so on. In an exemplary embodiment, the system 202 is implemented to operate as a stand-alone device. In another embodiment, the system 202 may be implemented to work as a loosely coupled device to a smart computing environment. The components and functionalities of the system 202 are described further in detail with reference to FIGS. 3-8.

Figure 3:
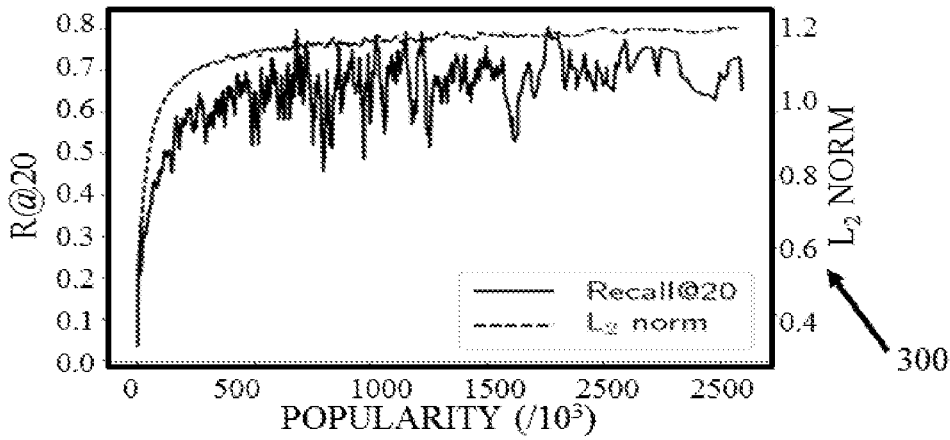
FIG. 3 illustrates variation of performance of GNN and L2 norm of learned item embeddings with item popularity with performance of GNN in accordance with some embodiments of the present disclosure.
Figure 4:
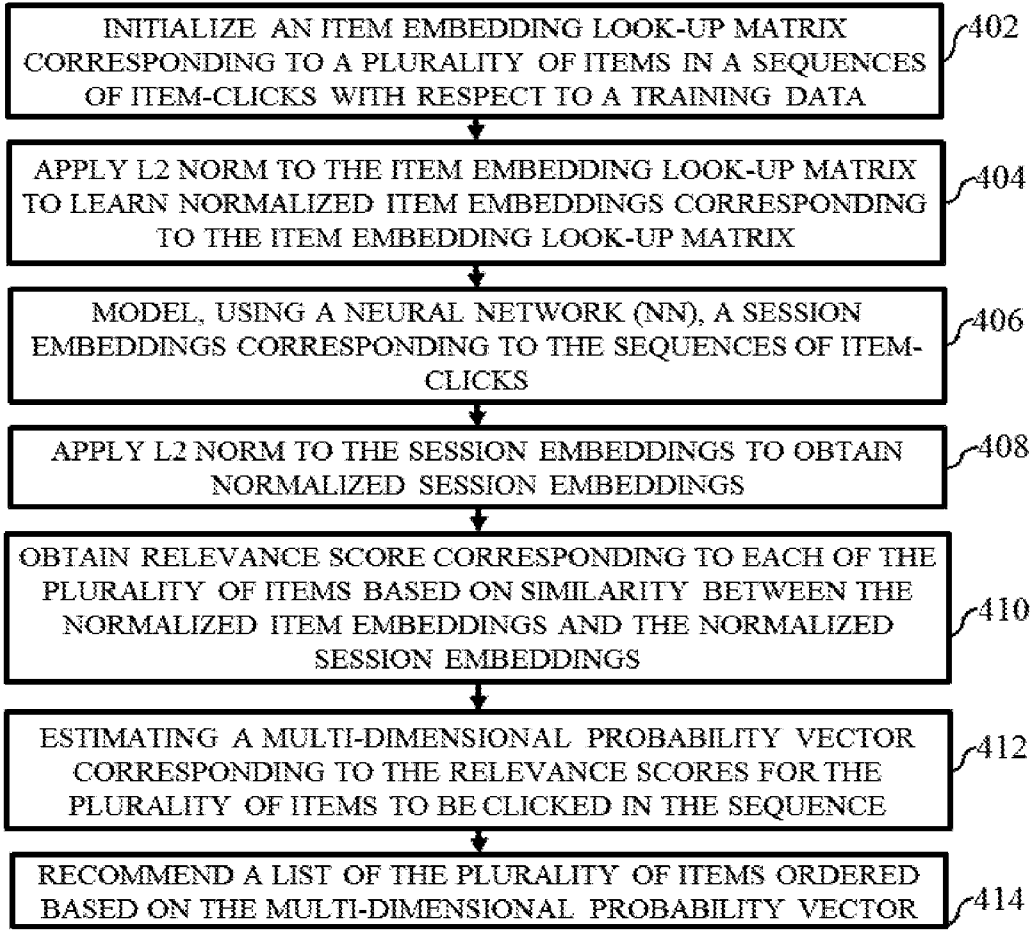
FIG. 4 is a flow diagram for a method for handling popularity bias in recommending items, in accordance with an example embodiment of the present disclosure.
Figure 5:
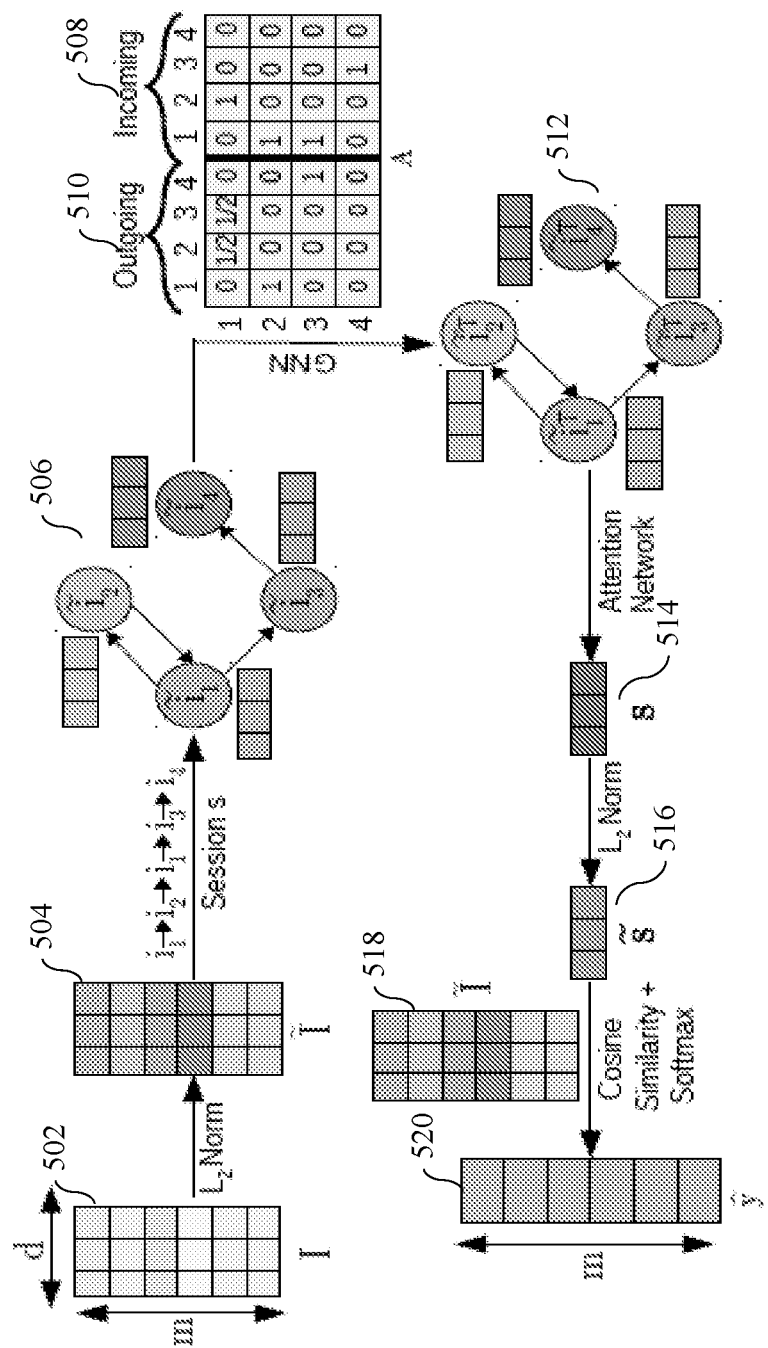
FIG. 5 is a process flow diagram for a method for handling popularity bias in recommending items using a GNN, in accordance with an example embodiment of the present disclosure.
Figure 6:
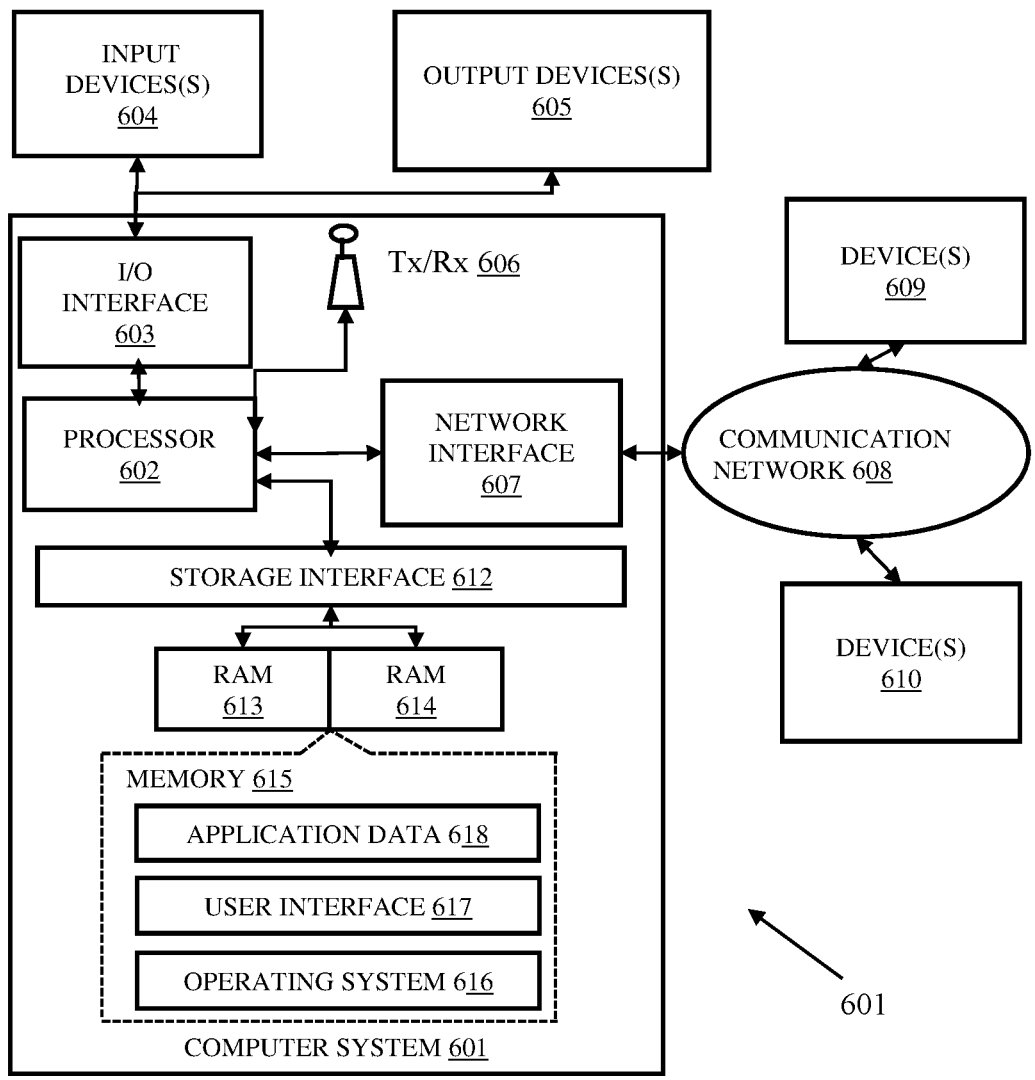
FIG. 6 illustrates a block diagram of an exemplary computer system for implementing embodiments consistent with the present disclosure.
Figure 7A:
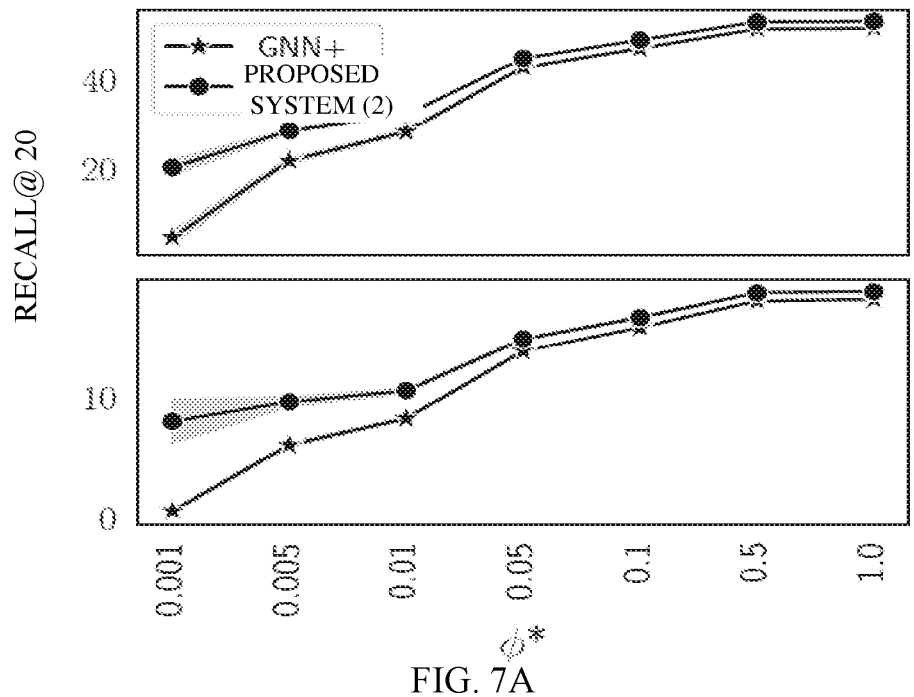
FIGS. 7A-7D and 8A-8C show variations illustrating performance of disclosed system vis-à-vis conventional system for recommending item in accordance with some embodiments of the present disclosure.
Figure 7B:
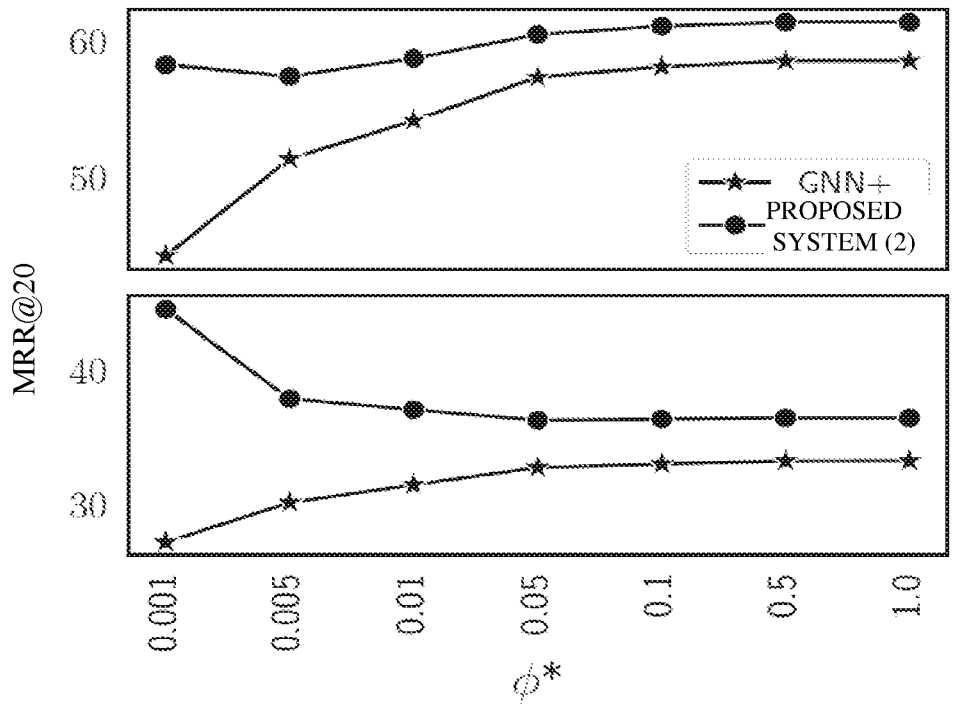
Figure 7C:
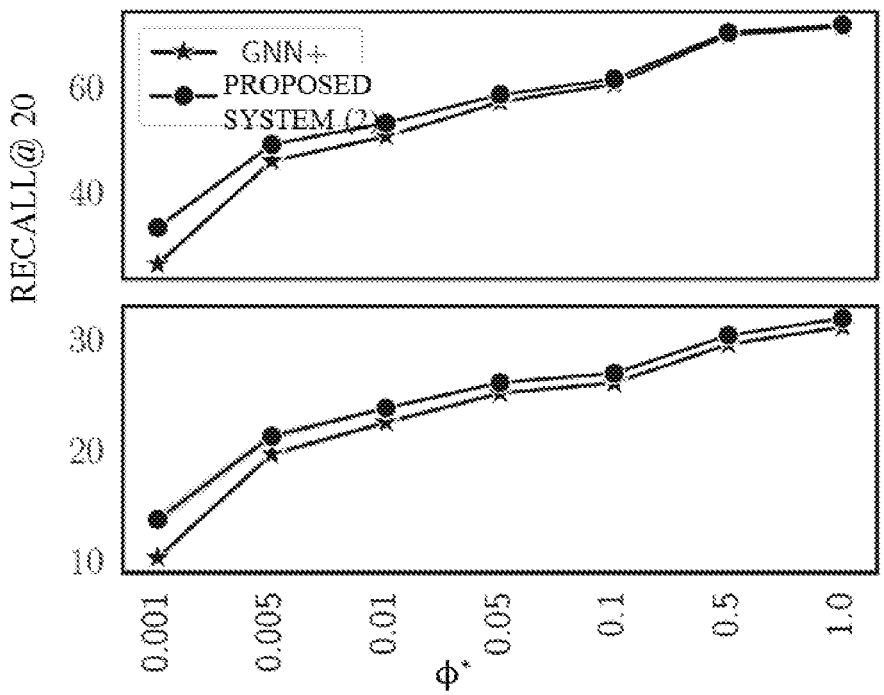
Figure 7D:
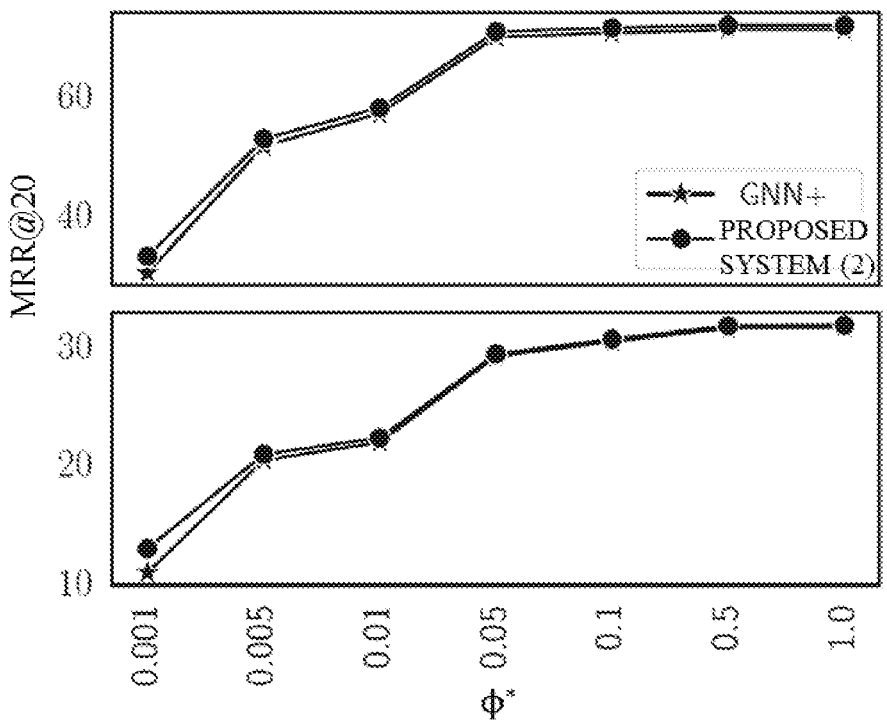
Figure 8A:
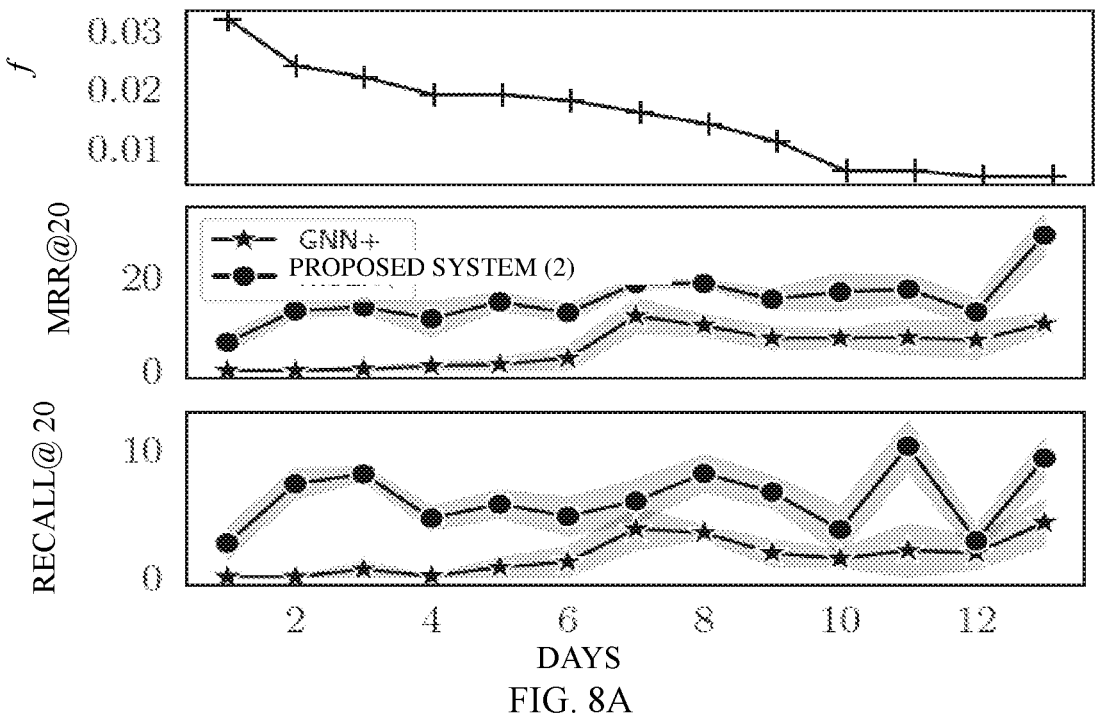
Figure 8B:
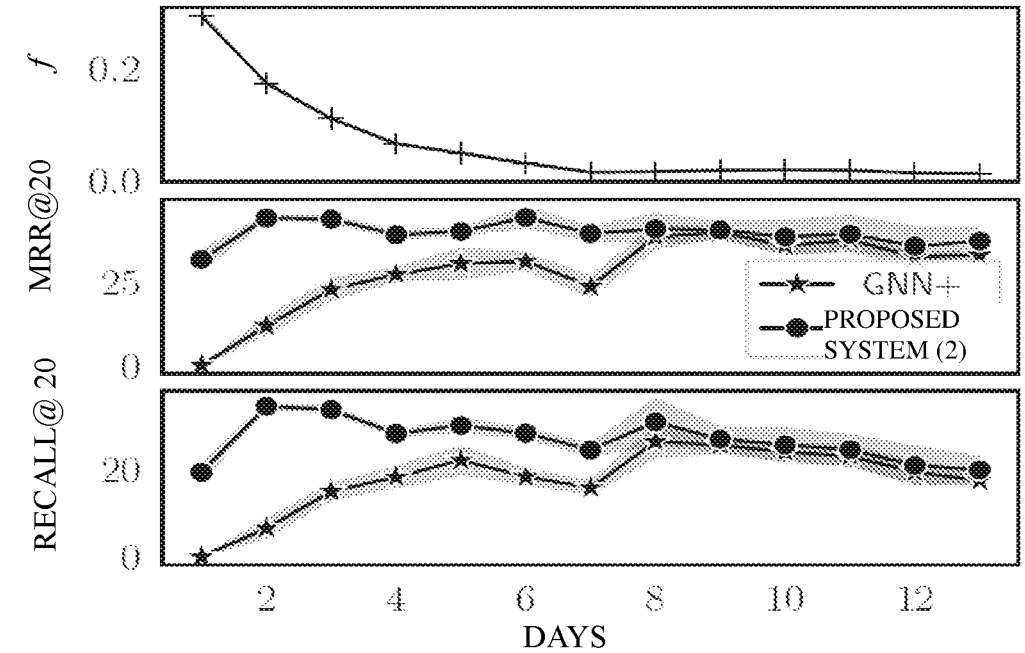
Figure 8C:
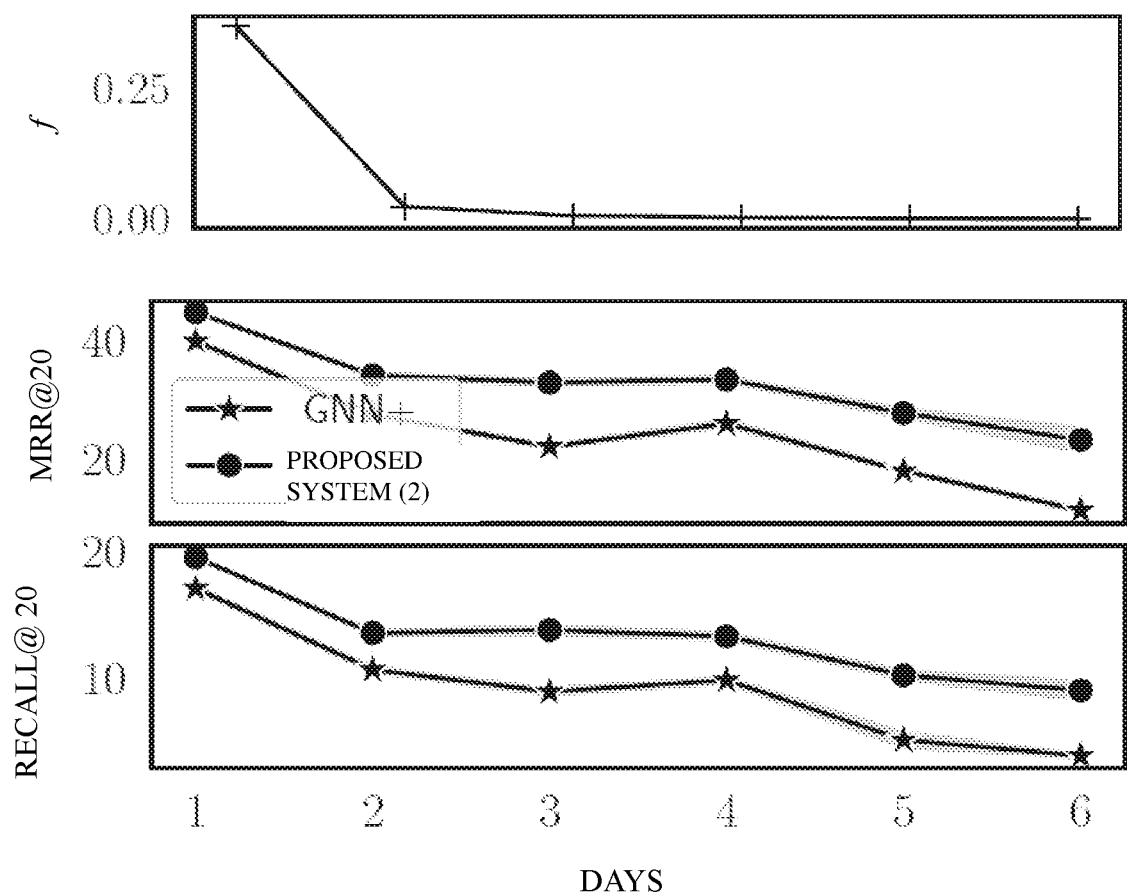

Referring collectively to FIGS. 3-5, components and functionalities of the system 202 for handling popularity bias in item recommendations is described in accordance with an example embodiment. For example, FIG. 3 illustrates variation of performance of GNN and L2 norm of learned item embeddings with item popularity with performance of GNN in accordance with some embodiments of the present disclosure. FIG. 4 illustrates a flow diagram for a method 400 for handling popularity bias in item recommendations in accordance with an example embodiment of the present disclosure. FIG. 5 illustrates an example process flow 500 for a method to handle popularity bias in item recommendations, in accordance with an example embodiment of the present disclosure. FIG. 6 illustrates a block diagram of an exemplary computer system for implementing embodiments consistent with the present disclosure.

In an embodiment, handling the popularity bias in the item recommendations may be treated as a technical problem of obtaining a sequence of item-clicks s that is close to the embedding of a target item such that the estimated index/class for the target item is an item for which similarity between the item embeddings and the sequence of item-clicks is maximum. Mathematically, the estimated index/class for the target item may be represented as:

$$k=\arg\max_j j_j^T s$$

As a technical solution to the aforementioned technical problem, the popularity bias in item recommendations is handled by normalizing the item embeddings and session embeddings prior to obtaining cosine similarity between the two. Normalizing the item embeddings and session embeddings has the technical effect of reducing the popularity bias and ensuring that less popular items that are relevant and recommendable have a high probability of getting recommended. As a result, the average popularity of the items in the recommendation list is reduced (in terms of Average Recommendation Popularity metric) while at the same time the relevance of the items is increased (in terms of Recall@K and Mean Reciprocal where K is the length of the recommendation list).

For handling the item recommendations, a function $f$ (for example a neural network parameterized by $\theta$) may be incorporated by the system such that it maps the items in a session s (or a sequence of item-clicks) to session embedding $s=f(I_s;\theta)$, where $I_s=[i_{s,1}, i_{s,2}, \ldots, i_{s,l}]^T \in \mathbb{R}^{l \times d}$. In an embodiment, the neural network may be a Graph Neural Network (GNN). In this embodiment, along with $I_s$ as an input which considers s as a sequence of item-clicks, the system also takes an adjacency matrix $A_s$ to incorporate a graph structure. This embodiment of incorporating GNN as the neural network is described further with reference to FIG. 5.

Herein, the system obtains s that is close to the embedding $i_{s,l+1}$ of the target item $i_k=i_{s,l+1}$, such that the estimated index/class for the target item is $k=\arg\max_j j_j^T s$, with j=1 . . . m. In a DNN-based model f, this is approximated via a differentiable softmax function such that the probability of next item being $i_k$ is given by:

$$p_k(s) = \hat{y}_k = \frac{\exp(i_k^T s)}{\sum_{j=1}^{m} \exp(i_j^T s)} \quad (1)$$

For the m-way classification task, softmax (cross-entropy) loss is used during training for estimating θ by minimizing the sum of $L(\hat{y}) = -\Sigma_{j=1}^{m} y_j \log(\hat{y}_j)$ over all training samples, where $y \in \{0,1\}^m$ is a 1-hot vector with $y_k=1$ corresponding to the correct (target) class k.

As is understood, optimizing for the softmax loss leads to a radial distribution of features for a target class. If k=arg max$_j$ $i_j^T$s, then $$\frac{\exp(i_k^T s)}{\sum_{j \neq 1}^{m} \exp(i_j^T s) + \exp(i_k^T s)} > \frac{\exp(i_k^T s)}{\sum_{j=1}^{m} \exp(i_j^T s)} \quad (2)$$

for any σ>1.

This, in turn, implies that softmax loss favors large norm of features for easily classifiable instances. This means that a high value of $\hat{y}_k$ can be attained by multiplying vector $i_k$ by a scalar value σ>1; or simply by ensuring a large norm for the item embedding vector. An application of the radial property is that the target items that are easier to predict are likely to have higher L2 norm.

Items that are popular are likely to be clicked more often, and hence the trained parameters θ and I should have values that ensure these items get recommended more often. Utilizing the radial property, for a given input s and a popular target item $i_k$, the system obtains a correct classification decision by learning the embedding vector $i_k$ with high $\|ik\|_2$ such that the inner product $i_k^T s = \|ik\|_2 \|s\|_2 \cos \alpha$ (where α is the angle between the item and session embeddings) is likely to be high, thereby ensuring large value for $\hat{y}_k$ (even when a is not small enough and $\|s\|_2$ is not large enough).

Referring to FIG. 3 illustrating variation 300 of performance of GNN (depicted in terms of) with item popularity, while analyzing the item embeddings from a GNN model, it is observed that items with high popularity have high L2 norm while less popular items have significantly lower L2 norm. Further, performance of GNN degrades as the popularity of the target item decreases.

In order to minimize the influence of embedding norms in the final classification and recommendation decision, the disclosed method and system optimizes for cosine as a measure of similarity of item and session embeddings. A detailed flow-diagram describing a method 400 for handling popularity bias in item recommendations by normalizing item and session embeddings is described further below.

For the purpose of description, it is assumed that S denote all past sessions (also referred to as sequence of item-clicks), and I denote the set of m items observed in the set S. Any session s∈S is a chronologically ordered tuple of item-click events: $s=(i_{s,1}, i_{s,2}, \ldots, i_{s,t})$, where each of the t item-click events $i_{s,j}$ (j=1 . . . l) corresponds to an item in I, and j denotes the position of the item $i_{s,j}$ in the session s. As previously described, given s, the goal of the disclosed system is to predict the next item $i_{s,l+1}$ by estimating the m-dimensional probability vector $\hat{y}_{s,l+1}$ corresponding to the relevance scores for the m items. The K items with highest scores constitute the top-K recommendation list. The method 400 of handling popularity bias in item recommendations is described further in the description below.

At 402, the method 400 includes initializing an item embedding look-up matrix I corresponding to a plurality (m) of items in a sequence of item-clicks with respect to a training data. Each item is mapped to a d-dimensional vector from the trainable embedding look-up table or matrix $I=[i_1, i_2, \ldots, i_m]^T \in R^{m \times d}$ such that each row $i_j \in R_d$ is the d-dimensional representation or embedding vector corresponding to item $i_j \in I$ (j=1 . . . m). A function $f$ is considered, for example, a neural network parameterized by θ that maps the items in a session s to session embedding s=$f$(Is; θ), where $I_s = [i_{s,1}, i_{s,2}, \ldots, i_{s,l}]^T \in R^{l \times d}$. Along with L as an input which considers s as a sequence of item-clicks (for example, by a user), an adjacency matrix $A_s$ is introduced to incorporate the graph structure, as will be described later.

At 404, the method 400 includes applying L2 norm to the item embedding look-up matrix I to learn normalized item embeddings corresponding to the item embedding look-up matrix. In various embodiments (during training phase as well as inference phase), the item embeddings are normalized as $$\tilde{i}_k = \frac{i_k}{\|i_k\|_2},$$

and the normalized item embedding are used to get $\tilde{I}_s$.

At 406, the method 400 includes modelling, using a neural network, session embeddings corresponding to the sequences of item-clicks. In an example embodiment, the session embeddings corresponding to the sequence of item-clicks is modelled by a neural network (function $f$). The session embedding is then obtained as s=$f$($\tilde{I}_s$; θ). At 408, the method 400 includes applying L2 norm to the session embeddings to obtain a normalized session embeddings $\tilde{S}$ to enforce a unit norm. Herein, examples of the neural network may be a recurrent neural network (RNN), a convolutional neural network (CNN), and so on. In an embodiment, the neural network is a Graph neural network (GNN). An example process flow for a method of modelling session embeddings corresponding to the sequence of item-clicks by using a GNN is described later with reference to FIG. 5.

At 410, the method 400 includes obtaining relevance score corresponding to each of the plurality of items based on similarity between the normalized item embeddings and the normalized session embeddings. The relevance score corresponding to each of the plurality of items are obtained based on similarity between the normalized item embeddings and the normalized session embeddings. In an embodiment, the normalized item and session embeddings are used to obtain the relevance score as per Eq. 3 that uses cosine similarity as a measure of similarity. Herein, the cosine similarity $\tilde{i}_k^T \tilde{S}$ is restricted to [−1, 1]. This implies that the softmax loss is likely to get saturated at high values for the training data: a scaling factor σ>1 is useful in practice to allow for better convergence.

At 412, the method 400 includes estimating a multi-dimensional probability vector corresponding to the relevance scores for the plurality of items to be clicked in the sequence. Thus, the probability of next item being $i_k$ is computed as:

$$= \frac{\exp(\sigma \tilde{i}_k^T \tilde{s})}{\sum_{j=1}^{m} \exp(\sigma \tilde{i}_k^T \tilde{s})} \quad (3)$$

At 414, the method 400 includes recommending a list of the plurality of items ordered based on the multi-dimensional probability vector. For example, if the multi-dimensional vector is an m-dimensional vector corresponding to the relevance scores for m items, then K items with highest scores constitute the list of top-K recommendation.

As previously described the neural network for handling popularity bias in item recommendations can be a GNN. The GNN can be used for modeling session embeddings corresponding to the sequence of item-clicks. Referring to FIG. 5, an example process flow for a method 500 of handling popularity bias in item recommendations is disclosed that utilizes GNN for modelling the session embeddings corresponding to the sequence of item-clicks. Herein, a session graph associated with the GNN is represented by $G_s$.

Herein, the item embedding look-up matrix I is initialized at 502, and L2 norm is applied to the item embedding look-up matrix I to learn a corresponding normalized item embedding $\tilde{I}$ at 504. The steps 502 and 504 (of FIG. 5) are similar to the steps 402 and 404, respectively (of FIG. 4), and hence for the brevity of description, these steps are not explained again in detail.

At 506, a session (or sequence of item-clicks such as $i_1$, $i_2$, $i_1$, $i_3$, $i_4$) s can be modeled as a graph $G_s=(V_s, E_s)$, where $i_{s,j} \in V_s$ is a node in the graph. Further, $(i_{s,j}, i_{s,j+1}) \in E_s$ is a directed edge from $i_{s,j}$ to $i_{s,j+1}$. Given s, the goal of the disclosed system is to predict the next item $i_{s,l+1}$ by estimating the m-dimensional probability vector $\hat{y}_{s,l+1}$ corresponding to the relevance scores for them items. The K items with highest scores constitute the top-K recommendation list.

For a $G_s$, two adjacency matrices $A_s^{in} \in R^{l,l}$ ($A_s^{in}$ marked as 508 in FIG. 5) and $A_s^{out} \in R^{l,l}$ ($A_s^{out}$ marked as 510 in FIG. 5) corresponding to the incoming and outgoing edges in graph $G_s$ may be considered. Each edge of the incoming edges and the outgoing edges has a normalized weight calculated as the occurrence of the edge divided by the outdegree of the start node of that edge.

GNN takes connection matrices $A_s^{in}$ and $A_s^{out}$ and the normalized item embeddings $\tilde{I}_s$ as input, and iteratively updates the normalized item embeddings of each node in the graph based on a current embedding of the node and the embeddings of neighboring nodes of the node. Finally, GNN returns an updated set of embeddings after a set (for example, τ number) of iterations of message propagation across vertices in the graph using gated recurrent units: $[\tilde{I}_{\tau s,1}, \tilde{I}_{\tau s,1}, \ldots, \tilde{I}_{\tau s,l}] = G(A_s^{in}, A_s^{out}, \tilde{I}_s; \theta_g)$, where $\theta_g$ represents the parameters of the GNN function G. For any node in the graph, the current representation of the node and the representations of its neighboring nodes are used to iteratively update the representation of the node τ times. More specifically, the representation of node $i_{s,j}$ in the t-th message propagation step is updated as follows:

$$a_{s,j}^t = [A_{s,j:}^{in} \tilde{I}_s H_1, A_{s,j:}^{out} \tilde{I}_s H_2]^T + b \quad (4)$$

$$z_{s,j}^t = \sigma(W_z a_{s,j}^t + U_z \tilde{i}_{s,j}^{t-1}) \quad (5)$$

$$r_{s,j}^t = \sigma(W_r a_{s,j}^t + U_z \tilde{i}_{s,j}^{t-1}) \quad (6)$$

$$\hat{i}_{s,j}^t = \tanh(W_o a_{s,j}^t + U_o(r_{s,j}^t \odot \tilde{i}_{s,j}^{t-1})) \quad (7)$$

$$\tilde{i}_{s,j}^t = (1-z_{s,j}^t) \odot \tilde{i}_{s,j}^{t-1} + z_{s,j}^t \odot \hat{i}_{s,j}^t \quad (8)$$

where $A_{s,j:}^{in} \in R^{l \times l}$ depicts the j-th row of $A_s^{in}$, H1, $H2 \in R^{d \times d}$, $W_{(.)}$ and $U_{(.)}$ are trainable parameters, $\sigma_{(.)}$ is the sigmoid function, and $\odot$ is the element-wise multiplication operator.

To incorporate sequential information of item interactions, the system may optionally learn position embeddings and add the learnt position embeddings to item embeddings to effectively obtain position-aware item (and subsequently session) embeddings. The final embeddings for items in a session are computed as $\tilde{i}_{s,j}^{\tau,p} = \tilde{i}_{s,j}^{\tau} + p_j$, where $p_j \in R^d$ is embedding vector for position/obtained via a lookup over the position embeddings matrix $P = [p_1, p_2, \ldots, p_L]^T \in R^{L \times d}$ where L denotes the maximum length of any input session such that position l≤L.

The soft-attention weight of the j-th item in session s is computed as $(W_1 \tilde{i}_{s,j}^{\tau,p} + W_2 \tilde{i}_{s,j}^{\tau,p} + c)$, where $q, c \in R^d$, $W_1, W_2 \in R^{d \times d}$. The $\alpha_j$s are further normalized using softmax. An intermediate session embedding s' is computed as: $\dot{s} = \sum_{j=1}^l \alpha_j \tilde{i}_{s,j}^{\tau}$ The session embedding s is a linear transformation over the concatenation of intermediate session embedding s' and the embedding of most recent item $\tilde{i}_{s,j}^{\tau,p}$, s.t $s = W_3[\dot{s}; \tilde{i}_{s,j}^{\tau,p}]$ where $W_3 \in R^{d \times 2d}$.

The final recommendation scores for the m items are computed as per Eq. 3. Herein, it will be noted that while the session-graph embedding is obtained using item embeddings $\tilde{i}_{s,j}^{\tau,p}$, that are aware of the session-graph and sequence, the normalized item embeddings $\tilde{I}_j$ (j=1 . . . m) independent of a particular session are used to compute the recommendation scores.

A system embodying the method 400 (of FIG. 4) and the process flow 500 (of FIG. 5) is described further with reference to FIG. 6.

Referring now to FIG. 6, a block diagram of an exemplary computer system 601 for implementing embodiments consistent with the present disclosure is disclosed. The computer system 601 may be implemented in alone or in combination of components of the system 202 (FIG. 2). Variations of computer system 601 may be used for implementing the devices included in this disclosure. Computer system 601 may comprise a central processing unit ("CPU" or "hardware processor") 602. The hardware processor 602 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 602 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 508 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609 and 610. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 602 may be disposed in communication with one or more memory devices (e.g., RAM 513, ROM 514, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 616, user interface application 617, user/application data 618 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 601 may store user/application data 618, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

An example scenario depicting the results of item recommendation performed by the disclosed system is described further. The disclosed system is evaluated on publicly available benchmark datasets: i) Yoochoose (YC): RecSys'15 Challenge dataset, ii) Diginetica (DN): CIKM Cup 2016 dataset, and iii) RetailRocket(RR), as summarized in Table 1.

Given the large number of sessions in YC, the recent ¼ and ¹⁄₆₄ fractions of the training set are used to form two datasets: YC-1/4 and YC-1/64, respectively. Herein, two evaluation settings are considered, namely offline and online. For evaluation in offline setting, static splits of train and test as used for YC and DN. For RR, sessions from last 14 days for testing and remaining 166 days for training are used. For evaluation in online setting, the models were re-trained every day for two weeks (number of sessions per day for YC is much larger, so evaluated for one week due to computational constraints) by appending the sessions from that day to the previous train set. The test results of the trained model on sessions from the subsequent day are reported.

For the purpose of experiment, 10% of train set was used as hold-out validation set for hyperparameter tuning and early-stopping. Moreover, d=100 and learning rate of 0.001 with Adam optimizer were utilized. Five models were trained for the best hyperparameters with random initialization, and average and standard deviation of various metrics are reported for all datasets except for YC-1/4 where a single model is considered (as it is a large dataset and takes 20 hours for training one model), it was found that for sessions with length l>10, considering only the most recently clicked 10 items to make recommendations worked consistently better across datasets. This variant was referred to as GNN+ and was used as additional pre-processing step in all the experiments.

TABLE 1

Statistics of the datasets used for offline experiments

| Statistics | DN | RR | YC-1/64 | YC-1/4 |
|---|---|---|---|---|
| #train Sessions | 0.7M | 0.7M | 0.4M | 0.6M |
| #test Sessions | 60,858 | 60,594 | 55,898 | 55,898 |
| #items | 43,097 | 48,759 | 16,766 | 29,618 |
| Average Length | 5.12 | 3.55 | 6.16 | 5.17 |

Building on top of GNN+, following variants of the proposed embedding normalization approach were considered:
  Normalized Item Representations (NIR): Only item embeddings are normalized and scaling factor σ is not used,
  Normalized Item and Session Representations (Proposed system in one embodiment, referred to as Proposed system (1) for experimental results purpose): both item and session embeddings are normalized,
  NISER+ (Proposed system in another embodiment, referred to as proposed system (2) for experimental results purpose): Proposed system (1) with position embeddings and dropout applied to input item embeddings.
Herein, the system 202 (FIG. 2) and the system 501 (FIG. 5) are examples of the proposed system, for example the proposed system (1) and the proposed system (2).

A scale factor of σ=16.0 was found best to work best across most models trained on respective hold-out validation sets, and hence, use same value across datasets for consistency. A dropout probability of 0.1 on dimensions of item embeddings was used in proposed system across all models. The evaluation metrics Recall@K and Mean Reciprocal Rank (MRR@K) with K=20 were used. For evaluating popularity bias, the following metrics were considered:

Average Recommendation Popularity (ARP): This measure calculates the average popularity of the recommended items in each list as follows:

$$ARP = \frac{1}{|S|} \sum_{s \in S} \frac{\sum_{i \in L_S} \phi(i)}{K} \quad (9)$$

where φ(i) is popularity of item i, i.e. the number of times item i appears in the training set, and |S| is the number of sessions in the test set.

An item belongs to the set $\Gamma_\phi^*$ of long-tail items or less popular items If $\frac{\phi(i)}{\max_i \phi(i)} \leq \phi^*$ The performance is evaluated in terms of Recall@20 and MRR@20 for the sessions with target item in the set $\Gamma_\phi^*$ by varying φ*. The results of experiments are described hereunder.

Proposed system (2) reduces popularity bias in GNN+: From FIGS. 7A-7D, it is observed that proposed system (2) outperforms GNN+ for sessions with less popular items as targets (i.e. when φ* is small), with gains as high as 13%, 8%, 5%, and 2% for DN, RR, YC-1/64, and YC-1/4 respectively for φ*=0.01 in terms of Recall@20. Similarly, gains are 28%, 18%, 6%, 2% in terms of MRR@20. Gains for DN and RR are high as compared to YC. This is due to the high value of maxiφ(i), if instead we consider φ*=0.001, gains are high as 26%, and 9% for YC-1/64, and YC-1/4 respectively in terms of Recall@20. Similarly, gains are 34%, and 19% in terms of MRR@20. It is also noted that proposed system (2) is at least as good as GNN+ even for the sessions with more popular items as targets (i.e. when φ* is large). Furthermore, Table 2 shows that ARP for proposed system (2) is significantly lower than GNN+ indicating that proposed system (2) is able to recommend less popular items more often than GNN+, thus reducing popularity bias.

TABLE 2

Offline setting evaluation: proposed system (2) versus GNN+ in terms of Average Recommendation Popularity (ARP). Lower values of ARP indicate lower popularity bias

| Method | DN | RR | YC-1/64 | YC-1/4 |
|---|---|---|---|---|
| GNN+ | 495.25 ± 2.52 | 453.39 ± 8.97 | 4128.54 ± 27.80 | 18042.29 |
| Proposed system(2) | 487.31 ± 0.30 | 398.53 ± 3.09 | 3972.40 ± 41.04 | 16559.44 |

TABLE 3

Proposed system versus other benchmark methods in offline setting. Numbers after ± are standard deviation values over five models

| Method | DN | RR | YC-1/64 | YC-1/4 |
|---|---|---|---|---|
| Recall@20 | | | | |
| SKNN | 48.06 | 56.42 | 63.77 | 62.13 |
| STAN | 50.97 | 59.8 | 69.45 | 70.07 |
| GRU4REC | 29.45 | — | 60.64 | 59.53 |
| NARM | 49.7 | — | 68.32 | 69.73 |
| STAMP | 45.64 | 53.94 | 68.74 | 70.44 |
| GNN | 51.39 ± 0.38 | 57.63 ± 0.15 | 70.54 ± 0.14 | 70.98 |
| GNN+ | 51.81 ± 0.11 | 58.59 ± 0.10 | 70.85 ± 0.08 | 71.04 |
| NIR | 52.40 ± 0.06 | 60.67 ± 0.08 | 71.12 ± 0.05 | 71.19 |
| Proposed system (1) | 52.63 ± 0.09 | 60.85 ± 0.06 | 70.86 ± 0.15 | 71.71 |
| Proposed system (2) | 53.39 ± 0.06 | 61.41 ± 0.09 | 71.27 ± 0.05 | 71.8 |
| MRR@20 | | | | |
| SKNN | 16.95 | 33.16 | 25.22 | 24.82 |
| STAN | 18.48 | 35.32 | 28.74 | 28.89 |
| GRU4REC | 8.33 | — | 22.89 | 22.6 |
| NARM | 16.17 | — | 28.63 | 29.23 |
| STAMP | 14.32 | 28.49 | 29.67 | 30 |
| GNN | 17.79 ± 0.16 | 32.74 ± 0.09 | 30.80 ± 0.09 | 31.47 |
| GNN+ | 18.03 ± 0.05 | 33.29 ± 0.03 | 30.84 ± 0.10 | 31.48 |
| NIR | 18.52 ± 0.06 | 35.57 ± 0.05 | 30.99 ± 0.10 | 31.77 |
| Proposed system (1) | 18.27 ± 0.10 | 36.09 ± 0.03 | 31.50 ± 0.11 | 31.67 |
| Proposed system (2) | 18.72 ± 0.06 | 36.50 ± 0.05 | 31.61 ± 0.02 | 31.66 |

(2) Proposed system (2) improves upon GNN+ in online setting for newly introduced items in the set of long-tail items $\Gamma\phi^*$. These items have small number of sessions available for training at the end of the day they are launched. From FIGS. 8A-8C, it is observes that for the less popular newly introduced items, proposed system (2) outperforms GNN+ for sessions where these items are target items on the subsequent day. This proves the ability of proposed system (2) to recommend new items on very next day, primarily due to its ability to reduce popularity bias.

Furthermore, for DN and RR, it was observed that during initial days, when training data is less, GNN+ performs poorly while performance of proposed system (2) is relatively consistent across days indicating potential regularization effect of the proposed system (1) on GNN models in less data scenarios. Also, as days pass by and more data is available for training, performance of GNN+ improves with time but still stays significantly below proposed system (2). For YC, as days pass by, the popularity bias becomes more and more severe (as depicted by very small value for f, i.e. the fraction of sessions with less popular newly introduced items) such that the performance of both GNN+ and proposed system (2) degrades with time. However, importantly, proposed system (2) still performs consistently better than GNN+ on any given day as it better handles the increasing popularity bias.

(3) Proposed system (1) and proposed system (2) outperform GNN and GNN+ in offline setting: From Table 3, it was observed that proposed system (2) shows consistent and significant improvement over GNN in terms of R and MRR, establishing a new state-of-the-art in SR. An ablation study (removing one feature of proposed system (2) at a time) was conducted to understand the effect of each of the following features of proposed system (2): i. L2 normalization of embeddings, ii. Including position embeddings, and iii. applying dropout on item embeddings. As shown in Table 4, it was observed that L2 normalization is the most important factor across datasets while dropout and position embeddings contribute in varying degrees to the overall performance of proposed system (2).

TABLE 4

Ablation results for proposed system (2) indicating that normalization of embeddings (L2 norm) contributes the most to performance improvement. Here PE: Position Embeddings.

| Method | DN | RR | YC-$\frac{1}{64}$ | YC-$\frac{1}{4}$ |
|---|---|---|---|---|
| | | Recall@20 | | |
| Proposed system (2) | 53.39 ± 0.06 | 61.41 ± 0.09 | 71.27 ± 0.05 | 71.8 |
| L2 Norm | 52.23 ± 0.10 | 59.16 ± 0.10 | 71.10 ± 0.09 | 71.27 |
| Dropout | 52.81 ± 0.12 | 60.99 ± 0.09 | 71.07 ± 0.13 | 71.88 |
| PE | 53.11 ± 0.12 | 61.22 ± 0.03 | 71.13 ± 0.04 | 71.69 |
| | | MRR@20 | | |
| Proposed system (2) | 18.72 ± 0.06 | 36.50 ± 0.05 | 31.61 ± 0.02 | 31.66 |
| L2 Norm | 18.11 ± 0.05 | 33.78 ± 0.04 | 30.90 ± 0.07 | 31.44 |
| Dropout | 18.43 ± 0.11 | 35.99 ± 0.02 | 31.56 ± 0.06 | 31.74 |
| PE | 18.60 ± 0.09 | 36.32 ± 0.03 | 31.68 ± 0.05 | 31.64 |

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for handing popularity bias in item recommendations in an effective manner. In an embodiment, the disclosed system obtains a session s (or sequence of item-clicks) that is close to the embedding of a target items. The session is modelled by normalizing the item embeddings and session embeddings prior to obtaining cosine similarity between the two, so as to reduce the popularity bias in item recommendations. Due to reduction in the popularity bias, the disclosed method and system are able to recommend less popular items or items that have been added to catalogue recently.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor-implemented method comprising:
    initializing, via one or more hardware processors, an item embedding look-up matrix corresponding to a plurality of items in a sequence of item-clicks associated with a training data;
    applying, via the one or more hardware processors, $L_2$ norm to the item embedding look-up matrix to learn normalized item embeddings corresponding to the item embedding look-up matrix;
    modelling, using a neural network (NN), session embeddings corresponding to the sequence of item-clicks, via the one or more hardware processors, wherein the NN is a Graph Neural Network (GNN), wherein the GNN models the sequence of item-clicks as a graph, and, the graph comprises a plurality of nodes and a plurality of edges between node-pairs of the plurality of nodes, each node of the plurality of nodes indicative of the item in the sequence of item-clicks and each edge representing transitions between the items in the sequence of item-clicks, wherein modelling the session embeddings comprises:
        receiving, by the GNN, normalized item embeddings and adjacency matrices corresponding to a plurality of incoming edges and outgoing edges in the graph, each edge of the plurality of incoming edges and the outgoing edges having a normalized weight calculated as occurrence of the edge divided by an out degree of a start node of the edge;
        iteratively updating the normalized item embeddings of each node of the plurality of nodes in the graph based on a current embedding of the node and the embeddings of neighboring nodes of the node; and
        returning an updated set of normalized item embeddings after a set of iterations of message propagation across the plurality of nodes in the graph using gated recurrent units;
    applying $L_2$ norm to the session embeddings to obtain normalized session embeddings, via the one or more hardware processors;
    obtaining, via the one or more hardware processors, relevance score corresponding to each of the plurality of items based on a similarity between the normalized item embeddings and the normalized session embeddings;
    estimating, via the one or more hardware processors, a multi-dimensional probability vector corresponding to the relevance scores for the plurality of items to be clicked in the sequence; and
    recommending, via the one or more hardware processors, a list of the plurality of items ordered based on the multi-dimensional probability vector.

2. The processor implemented method of claim 1, further comprising passing, through an attention network, the updated set of normalized item embeddings, to obtain intermediate session embeddings, wherein a session embedding of the session embdeddings is a linear transformation over the concatenation of an intermediate session embedding and an embedding of most recent item in the sequence of item-clicks.

3. The processor implemented method of claim 1, wherein the probability of next item to be clicked is given by equation:

$$\hat{y}_k = \frac{\exp(\sigma \tilde{i}_k^T \tilde{s})}{\sum_{j=1}^m \exp(\sigma \tilde{i}_k^T \tilde{s})}$$

where, σ is a scaling factor >1,
ik representing the next item.

4. The processor implemented method of claim 1, further comprising a training phase for training the NN, wherein the training phase comprises learning a set of parameters of the item embedding look-up matrix and a set of parameters of the NN by optimizing for cross-entropy loss using a plurality of training samples from the training data.

5. A system comprising:
    one or more memories; and
    one or more first hardware processors, the one or more first memories coupled to the one or more first hardware processors, wherein the one or more first hardware processors are configured to execute programmed instructions stored in the one or more first memories, to:
    initialize an item embedding look-up matrix corresponding to a plurality of items in a sequence of item-clicks associated with a training data;
    apply $L_2$ norm to the item embedding look-up matrix to learn normalized item embeddings corresponding to the item embedding look-up matrix;
    model, using a neural network (NN), session embeddings corresponding to the sequences of item-clicks, wherein the NN is a Graph Neural Network (GNN), wherein the GNN models the sequence of item-clicks as a graph, and, the graph comprises a plurality of nodes and a plurality of edges between node-pairs of the plurality of nodes, each node of the plurality of nodes indicative of the item in the sequence of item-clicks and each edge representing transitions between the items in the sequence of item-clicks, wherein to model the session embeddings, the one or more hardware processors are configured by the instructions to:
  receive, by the GNN, normalized item embeddings and adjacency matrices corresponding to a plurality of incoming edges and outgoing edges in the graph, each edge of the plurality of incoming edges and the outgoing edges having a normalized weight calculated as occurrence of the edge divided by an out degree of a start node of the edge;
  iteratively update the normalized item embeddings of each node of the plurality of nodes in the graph based on a current embedding of the node and the embeddings of neighboring nodes of the node; and
  return an updated set of normalized item embeddings after a set of iterations of message propagation across the plurality of nodes in the graph using gated recurrent units;
apply $L_2$ norm to the session embeddings to obtain normalized session embeddings;
obtain relevance score corresponding to each of the plurality of items based on similarity between the normalized item embeddings and the normalized session embeddings;
estimate a multi-dimensional probability vector corresponding to the relevance scores for the plurality of items to be clicked in the sequence; and
recommend a list of the plurality of items ordered based on the multi-dimensional probability vector.

6. The system of claim 5, wherein the one or more hardware processors are configured by the instructions to pass, through an attention network, the updated set of normalized item embeddings, to obtain intermediate session embeddings, wherein a session embedding of the session embdeddings is a linear transformation over the concatenation of the intermediate session embedding and an embedding of most recent item in the sequence of item-clicks.

7. The system of claim 5, wherein the probability of next item to be clicked is given by equation:

$$\hat{y}_k = \frac{\exp(\sigma \tilde{i}_k^T \tilde{s})}{\sum_{j=1}^{m} \exp(\sigma \tilde{i}_k^T \tilde{s})}$$

where, σ is a scaling factor >1,
ik representing the next item.

8. The system of claim 5, wherein the one or more hardware processors are configured by the instructions to train the NN during a training phase, and wherein in the training phase, the one or more hardware processors are configured by the instructions to learn a set of parameters of the item embedding look-up matrix and a set of parameters of the NN by optimizing for cross-entropy loss using a plurality of training samples from the training data.

9. One or more non-transitory machine readable information storage mediums comprising one or more instructions which when executed by one or more hardware processors cause:
  initializing, via one or more hardware processors, an item embedding look-up matrix corresponding to a plurality of items in a sequence of item-clicks associated with a training data;
  applying, via the one or more hardware processors, $L_2$ norm to the item embedding look-up matrix to learn normalized item embeddings corresponding to the item embedding look-up matrix;
  modelling, using a neural network (NN), session embeddings corresponding to the sequence of item-clicks, via the one or more hardware processors, wherein the NN is a Graph Neural Network (GNN), wherein the GNN models the sequence of item-clicks as a graph, and, the graph comprises a plurality of nodes and a plurality of edges between node-pairs of the plurality of nodes, each node of the plurality of nodes indicative of the item in the sequence of item-clicks and each edge representing transitions between the items in the sequence of item-clicks, wherein modelling the session embeddings comprises:
    receiving, by the GNN, normalized item embeddings and adjacency matrices corresponding to a plurality of incoming edges and outgoing edges in the graph, each edge of the plurality of incoming edges and the outgoing edges having a normalized weight calculated as occurrence of the edge divided by an out degree of a start node of the edge;
    iteratively updating the normalized item embeddings of each node of the plurality of nodes in the graph based on a current embedding of the node and the embeddings of neighboring nodes of the node; and
    returning an updated set of normalized item embeddings after a set of iterations of message propagation across the plurality of nodes in the graph using gated recurrent units;
  applying $L_2$ norm to the session embeddings to obtain normalized session embeddings, via the one or more hardware processors;
  obtaining, via the one or more hardware processors, relevance score corresponding to each of the plurality of items based on a similarity between the normalized item embeddings and the normalized session embeddings;
  estimating, via the one or more hardware processors, a multi-dimensional probability vector corresponding to the relevance scores for the plurality of items to be clicked in the sequence; and
  recommending, via the one or more hardware processors, a list of the plurality of items ordered based on the multi-dimensional probability vector.

* * * * *